United States Patent
Hoang

(10) Patent No.: US 8,182,675 B2
(45) Date of Patent: May 22, 2012

(54) BIOLOGICAL CLEANING FILTER APPARATUS AND SYSTEM FOR AQUA-CULTURE

(76) Inventor: Hung Hoang, Alexandria, VA (US)

(*) Notice: Subject to any disclaimer, the term of this patent is extended or adjusted under 35 U.S.C. 154(b) by 408 days.

(21) Appl. No.: 12/436,603

(22) Filed: May 6, 2009

(65) Prior Publication Data
US 2009/0277849 A1 Nov. 12, 2009

Related U.S. Application Data

(60) Provisional application No. 61/071,555, filed on May 6, 2008.

(51) Int. Cl.
*B01D 35/00* (2006.01)
*B01D 24/00* (2006.01)
(52) U.S. Cl. .................... 210/167.22; 210/136; 210/278; 210/279

(58) Field of Classification Search .................. 210/130, 210/132, 133, 136, 167.13, 167.22, 269, 210/275, 278, 279
See application file for complete search history.

(56) References Cited

U.S. PATENT DOCUMENTS

| 2,755,246 A | * | 7/1956 | Whitlock, Jr. et al. | 210/191 |
| 3,335,752 A | * | 8/1967 | Hiers et al. | 137/599.15 |
| 3,459,305 A | * | 8/1969 | Berardi | 210/134 |
| 2006/0151366 A1 | * | 7/2006 | Hoang | 210/95 |

FOREIGN PATENT DOCUMENTS

JP 3-137906 A * 6/1991

* cited by examiner

*Primary Examiner* — Fred Prince
(74) *Attorney, Agent, or Firm* — Maier & Maier, PLLC

(57) ABSTRACT

A filter apparatus may be provided. The filter apparatus may include a multi-port valve; a strainer coupled in flow communication to the multi-port valve, wherein the strainer may include a conical portion and an attachment portion extending away therefrom; a diffusing column coupled to the strainer and coupled in flow communication to the multi-port valve; and an equalizer column coupled in flow communication to the strainer.

7 Claims, 3 Drawing Sheets

US 8,182,675 B2

BIOLOGICAL CLEANING FILTER APPARATUS AND SYSTEM FOR AQUA-CULTURE

CROSS-REFERENCE TO RELATED APPLICATIONS

This application claims priority to U.S. Provisional Application 61/071,555, filed May 6, 2008 and entitled BIOLOGICAL CLEANING FILTER APPARATUS AND SYSTEM FOR AQUA-CULTURE, the entire contents of which are hereby incorporated by reference.

BACKGROUND OF THE INVENTION

At least some known biological filters include a tank that includes a plurality of media positioned therein. The media is mixed with an amount of water contained within the tank. During a filtering mode, an amount of unfiltered water is channeled into the tank through a strainer such that the water is channeled over and through the media to facilitate trapping particulate matter within the media. During a cleaning mode, the flow of water is reversed such that an amount of water is used to agitate and stir the media. The dirt trapped within the media is released and mixes with the water to form a dirty water mixture that is channeled towards an exit waste line located at the top of the tank. In some known biological filters, during the cleaning mode, the media may gather near the exit at the top of the tank and begin to pack. As a result, a substantial amount of time, water and energy may be required to flush out the dirty water from the tank.

Some known filters may include a second exit to facilitate preventing the media from gathering near the first exit located at the top of the tank. Such second exits may include a drain assembly that is coupled to the wall of the tank to facilitate preventing the media from gathering near either of the exits. Such drain assemblies, however, facilitate increasing manufacturing and maintenance costs.

BRIEF DESCRIPTION OF THE INVENTION

In one embodiment a filter apparatus may be provided. The filter apparatus may include a multi-port valve; a strainer coupled in flow communication to the multi-port valve, the strainer comprising a conical portion and an attachment portion extending away therefrom; a diffusing column coupled to the strainer and coupled in flow communication to the multi-port valve; and an equalizer column coupled in flow communication to the strainer.

In another embodiment a filter apparatus may be provided. The filter apparatus may include a multi-port valve; a strainer coupled in flow communication to the multi-port valve, the strainer comprising a slotted portion and a non-slotted portion; an equalizer column coupled in flow communication to the strainer and having a first diameter; a diffusing column coupled to the strainer and coupled in flow communication to the multi-port valve, the diffuser column having a second diameter that is substantially smaller than the first diameter, wherein the diffuser column is positioned within the equalizer column such that a substantially annular gap is defined between the diffuser column and the equalizer column.

In yet another embodiment, a method of cleaning a filtering system that includes a multi-port valve, a strainer, a diffuser column, an equalizer column and a diffuser head may be provided. The method may include channeling fluid using the multi-port valve through the diffuser column and a plurality of diffuser slots defined on the diffuser head into a tank filled with filter media to facilitate creating a cyclonic action; channeling a first portion of fluid out of the tank to the multi-port valve using a plurality of strainer slots defined in the strainer; and channeling a second portion of fluid our of the tank to the multi-port valve using a plurality of equalizer slots defined in the equalizer column.

BRIEF DESCRIPTION OF THE DRAWINGS

Advantages of embodiments of the present invention will be apparent from the following detailed description of the exemplary embodiments. The following detailed description should be considered in conjunction with the accompanying figures in which:

FIG. 2b is an enlarged perspective view of the filtering assembly shown in FIG. 2a;

FIG. 3 is a perspective bottom view of a strainer that may be used with the filtering assembly shown in FIG. 2a;

FIG. 5b is a top view of the strainer shown in FIG. 5a;

DETAILED DESCRIPTION OF THE INVENTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Figure 1:
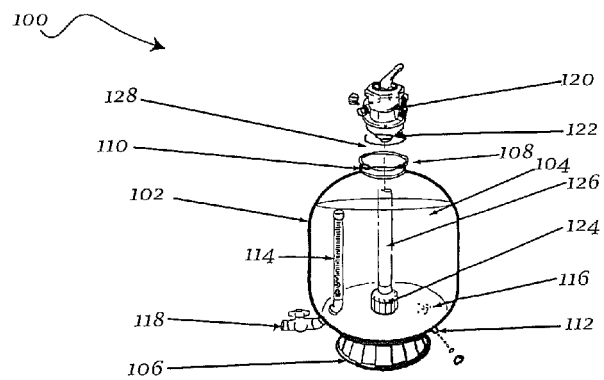
FIG. 1 is a perspective view of a prior art top mounted biological filtering system.

FIG. 1 is a perspective view of a prior art biological filter system 100. System 100 may include, but not limited to, a filter tank 102 that includes a cavity 104 defined therein, a filter base 106 and a top opening 108 that includes a clamp 110. Filter tank 102 may also include a winter drain plug 112 defined therein and a drain assembly 114 coupled to filter tank 102 and positioned therein. Moreover, a plurality of biological filter media 116 may be positioned within filter tank 102 to form a bed (not shown) of substantially packed filter media 116. Biological filter media 116 may be neutrally buoyant in water to facilitate a fluid flow of filter media 116 during a cleaning mode, as described in more detail below. Drain assembly 114 may be coupled in flow communication with a ball valve 118. System 100 may also include a multi-port valve 120 that includes a strainer 122 coupled thereto. Moreover, a diffuser head 124 may be coupled to a diffuser column 126, wherein diffuser column 126 is coupled to strainer 122, and more specifically, multi-port valve 120. Multi-port valve 120 may be coupled to filter tank 102 using an o-ring 128 and clamp 110. System 100, along with the operation of system 100 is described in more detail in U.S. Pat. No. 7,468,134 filed on Jan. 10, 2006, the contents of which are incorporated by reference in its entirety.

Figure 2A:
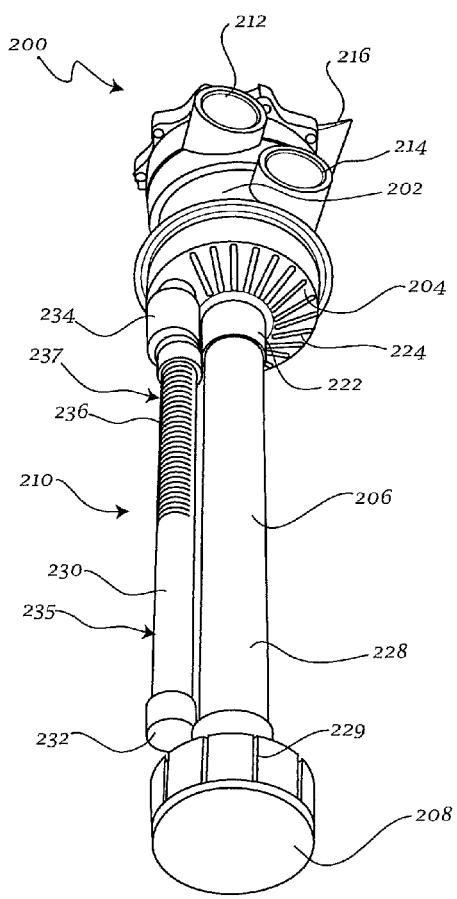
FIG. 2a is a perspective view of a filtering assembly that may be used with the filtering system shown in FIG. 1.
Figure 2B:
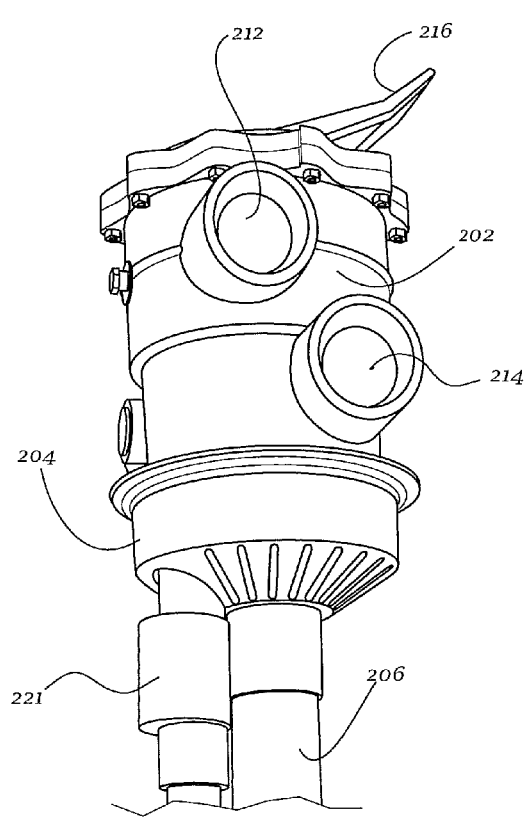
Figure 3:
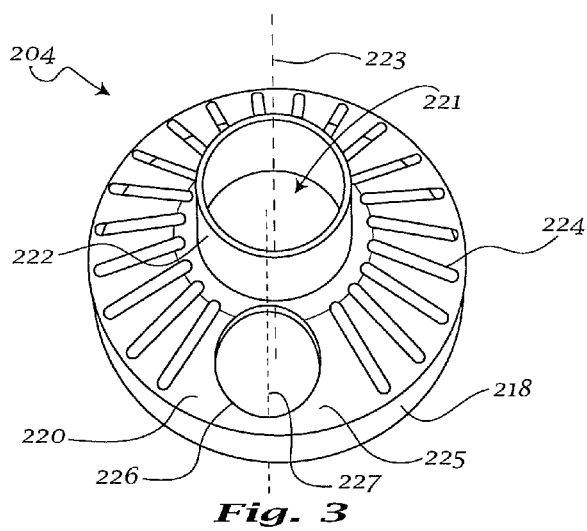

FIG. 2a is a perspective view of an alternative filtering assembly 200 that may be used in system 100. FIG. 2b is an enlarged perspective view of filtering assembly 200. FIG. 3 is a perspective bottom view of an alternative strainer 204 that may be used with filtering assembly 200. In the exemplary embodiment, filtering assembly 200 may include, but not limited to, a multi-port valve 202, strainer 204, a diffuser column 206, a diffuser head 208 and a drain assembly, or pressure equalizer assembly 210. In the exemplary embodiment, equalizer assembly 210 replaces drain assembly 114 of filter system 100, shown in FIG. 1. Multi-port valve 202 may include an inlet aperture 212, and outlet aperture 214, a waste aperture (not shown) and a valve handle 216.

In the exemplary embodiment, multi-port valve 202 may be coupled to strainer 204 that may include a substantially cylindrical portion 218 extending away from a substantially conical portion 220. Conical portion 220 may include an attachment portion 222 that extends away therefrom that defines a diffuser column channel 221 that may be coupled in flow communication to diffuser column 206. Moreover, diffuser column channel 221 may be substantially coaxial with a central axis 223 of strainer 204. Moreover, a plurality of evenly spaced strainer slots 224 may be defined in conical portion 220, wherein each strainer slot 224 is oriented substantially radially. Alternatively, strainer slots 224 may be oriented in any position that enables filtering assembly 200 to function as described herein. In the exemplary embodiment, strainer slots 224 may be sized to facilitate preventing filter media 116 from entering strainer 204 during the backwash mode, as described in more detail below. Conical portion 220 may also include at least one non-slotted portion 225 that may include at least one aperture 226 defined therein. In the exemplary embodiment, aperture 226 is substantially circular-shaped and may have a diameter that is about 1 inch. Aperture 226 may have an aperture axis 227 that is spaced a radial distance from central axis 223. Moreover, aperture axis 227 may be substantially parallel to central axis 223. In one alternative embodiment, aperture 226 may include any diameter and/or size that enables filtering assembly 200 to function as described herein. In another alternative embodiment, aperture 226 may be any shape that enables filtering assembly 200 to function as described herein.

Diffuser column 206 may be coupled in flow communication to attachment portion 222 of strainer 204. In one embodiment, diffuser column 206 may include a cylindrical tube portion 228 that extends away from strainer 204 and may be coupled in flow communication to diffuser head 208. Diffuser head 208 may include a plurality of diffuser slots 229 defined therein, wherein diffuser column 206 facilitates channeling water from multi-port valve 202 through cylindrical tube portion 228 and out diffuser slots 229 during the backwash mode. Conversely, diffuser column 206 facilitates channeling water from cavity 104 through diffuser slots 229 to multi-port valve 202 during the filtering mode.

In one embodiment, equalizer assembly 210 may be coupled in flow communication to strainer 204 using aperture 226. Moreover, equalizer assembly 210 may include an equalizer column 230, a plastic cap 232 and a check valve 234, wherein check valve 234 may be a swing check valve. Alternatively, check valve 234 may be any type of valve that enables filtering assembly 200 to function as described herein. In the exemplary embodiment, check valve 234 facilitates channeling water flow in a substantially upward, or vertical, direction. Moreover, check valve 234 facilitates preventing water flowing from strainer 204 into equalizer column 230. Specifically, one end of check valve 234 may be coupled to strainer 204 using aperture 226 such that the first end is positioned at least partially within aperture 226. Another end of check valve 234 may be coupled in flow communication to equalizer column 230. In one embodiment, equalizer column 230 may include a diameter that is about 1 inch. Alternatively, equalizer column 230 may include any diameter known to a person having ordinary skill in the art that enables filtering assembly 200 to function as described herein. Aperture 226, and more specifically check valve 234 may be positioned substantially adjacent an outlet opening (not shown) of multi-port valve 202 that facilitates channeling water into strainer 204. As a result, water entering strainer 204 is channeled towards check valve 234 such that a positive pressure is applied to check valve 234 which facilitates closing check valve 234, as described in more detail below.

Equalizer column 230 may extend a length from check valve 234 to an upper part of diffuser head 208. Moreover, equalizer column 230 may include a plurality of equalizer slots 236 defined therein. In one embodiment, equalizer slots 236 may be sized to prevent filter media 116 from entering equalizer column 230. Moreover, equalizer slots 236 may include a width that is about $\frac{1}{8}^{th}$ of an inch. Alternatively, equalizer slots 236 may include any width known to a person having ordinary skill in the art that enables filtering assembly 200 to function as described herein. In one embodiment, equalizer slots 236 may extend substantially half the circumference of equalizer column 230. Alternatively, equalizer slots 236 may extend any circumferential distance along equalizer column 230 that enables filtering assembly 200 to function as described herein. Further, a number of equalizer slots 236 may total an amount such that a total area of equalizer slots 236 may be substantially equal to a cross-sectional area of equalizer column 230, which facilitates providing unrestricted fluid flow through equalizer slots 236, equalizer column 230 and the waste line. Alternatively, the number of equalizer slots 236 may have any area known to a person having ordinary skill in the art that enables filtering assembly 200 to function as described herein. In the one embodiment, equalizer column 230 includes a non-slotted portion 235 and a slotted portion 237. In such an embodiment, slotted-portion 237 may be about half the length of equalizer column 230. As a result, equalizer slots 236 extend about halfway down equalizer column 230 which is approximately at the middle section of filtering assembly 200. Alternatively, slotted-portion 237 may be any length of equalizer column 230 known to a person having ordinary skill in the art that enables filtering assembly 200 to function as described herein.

In the exemplary embodiment, equalizer assembly 210 may be coupled to diffuser column 206. In one embodiment, equalizer assembly 210 is coupled to diffuser column 206 using a fastener such as, but not limited to, a screw (not shown). Alternatively, equalizer assembly 210 may be coupled to diffuser column 206 using any coupling means that enables filtering assembly 200 to function as described herein.

During operation, system 100, and more specifically filtering assembly 200 may be used in, but not limited to, a filtering mode and a backwash mode. During the filtering mode, water enters filtering assembly 200 through inlet aperture 212 of multi-port valve 202. In one embodiment, the water may be dirty pond water that requires filtering. In one alternative embodiment, the dirty water may come from any body of water that requires filtering, such as but not limited to, a pool, a lake, an aquatic tank, a nursery tank and the like. In another alternative embodiment, the water may be any fluid that requires filtering using filter media 116. In the exemplary embodiment, the water is channeled through multi-port valve 202 into strainer 204. The water entering strainer 204 contacts non-slotted portion 225 of strainer 204, and more specifically, a valve mechanism (not shown) of check valve 234. As a result, the entering water facilitates exerting a positive pressure on check valve 234, which facilitates closing check valve 234. As such, check valve 234 facilitates preventing water from flowing into equalizer column 230. Therefore the water flowing into strainer 204 from multi-port valve 202 exits strainer 204 through strainer slots 224. The water then enters cavity 104 of tank 102 and contacts filter media 116 substantially near the top of tank 102. The dirty water may contain particulate matter (not shown) from that requires filtering. Larger particulate matter (not shown) may be filtered out of the water near the top of the bed of filter media 116. Finer particulate matter (not shown) may flow through filter media 116 and may be trapped therein, which facilitates substantially filtering the water. The substantially filtered water may then be channeled from tank 102 into diffuser head 208 via diffuser slots 229, wherein the filtered water may be channeled up tube portion 228 towards multi-port valve 202. The filtered water may be channeled out of outlet aperture 214, which may be connected to a hose line (not shown) that channels the filtered water back to a source of the water. Alternatively, the filtered water may be channeled to an area independent from the source of the dirty water.

In one embodiment, the backwash mode may be used to flush out the filtered particulate matter that has collected in tank 102 and more specifically filter media 116. During backwash mode, a user may manipulate multi-port valve 202 such that the flow of water is reversed, with respect to the filtering mode. In one embodiment, the user may turn handle 216 such that water entering filtering assembly 200 is channeled from multi-port valve 202 through diffuser column 206 and exits filtering assembly 200 through diffuser slots 229. In one embodiment, diffuser slots 229 may be angled with respect to a line that may be substantially tangent to the outer cylindrical surface of diffuser head 208, as described in U.S. Pat. No. 7,468,134, which has been incorporated by reference in its entirety, as mentioned above. As a result, diffuser slots 229 may facilitate stirring and agitating the bed of filter media 116 such that a substantially swirling effect, or cyclonic action, occurs. In one embodiment, the cyclonic action unpacks the bed of filter media 116 into the swirling water, which enables the dirt, debris and other particulate matter trapped on and/or within filter media 116 to be released into the water to facilitate creating a dirty water mixture.

The dirty water mixture may be channeled out of tank 102 through strainer 204 using strainer slots 224 and then channeled out of filtering assembly 200 using the waste aperture of multi-port valve 202. In the event water was only channeled out of tank 102 using strainer slots 224, due to the neutral buoyancy of filter media 116, filter media 116 may pack around strainer slots 224, which may facilitate increasing the pressure substantially near a top portion of strainer 204 and of tank 102, which may facilitate increasing an amount of water necessary to clean system 100. In the exemplary embodiment, equalizer assembly 210 facilitates providing a second exit for the dirty water. During backwash mode, incoming water is no longer entering tank 102 via strainer 204. As a result, there is no positive pressure closing check valve 234. Accordingly, check valve 234 may open to facilitate channeling dirty water from tank 102 to strainer 204 and multi-port valve 202 via equalizer slots 236. Therefore, equalizer column 230 facilitates relieving the pressure build-up at the top of filter tank 102 by channeling water through a second exit using equalizer slots 236 of equalizer column 230, which facilitates preventing filter media 116 from packing and building up around strainer 204. As a result, equalizer column 230 enables filter media 116 to remain suspended in the water, due to the neutral buoyancy of filter media 116, as filtering assembly 200 agitates filter media 116 in a cyclonic manner for rapid removal of dirt, debris and other particulate matter trapped inside filter media 116.

In one embodiment, it is estimated that about half the amount of dirty water may exit through strainer slots 224 and the remaining amount may exit through equalizer slots 236. As a result, equalizer assembly 210 facilitates preventing filter media 116 from gathering or packing near strainer 204. As such, the amount of time, water and energy required to remove the dirty water from filtering system 100 is significantly reduced compared to filtering systems that include one dirty water exit. Moreover, the time and cost of manufacturing and maintaining equalizer assembly 210 of filtering system 100 is reduced compared to systems where the drain assembly is coupled to the wall of filter tank 102, as shown in FIG. 1.

Figure 4:
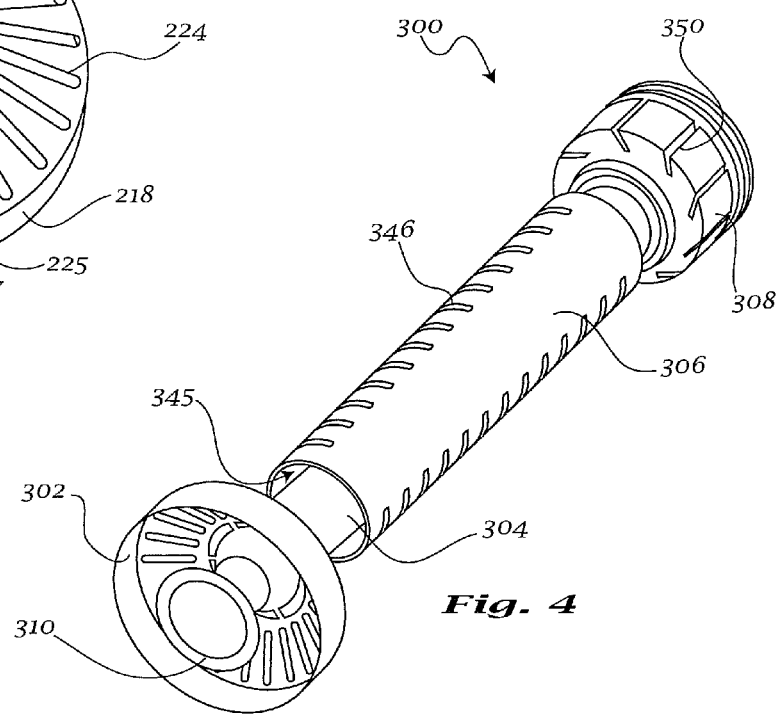
FIG. 4 is a perspective view of an alternative filtering assembly that may be used with the filtering system shown in FIG. 1.
Figure 5A:
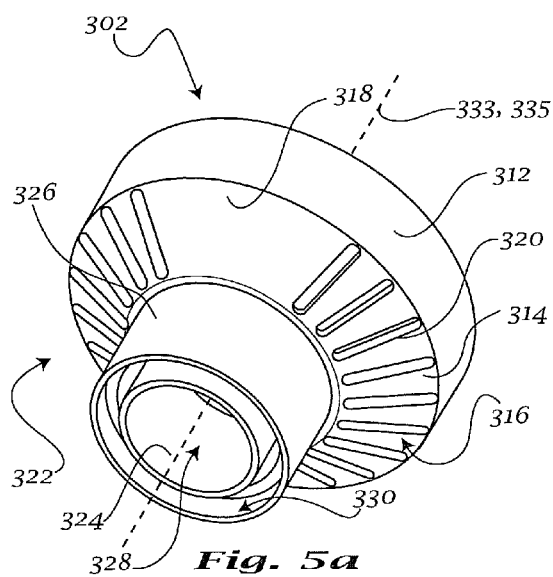
FIG. 5a is a perspective view of an alternative strainer that may be used with the filtering assembly shown in FIG. 4.
Figure 5B:
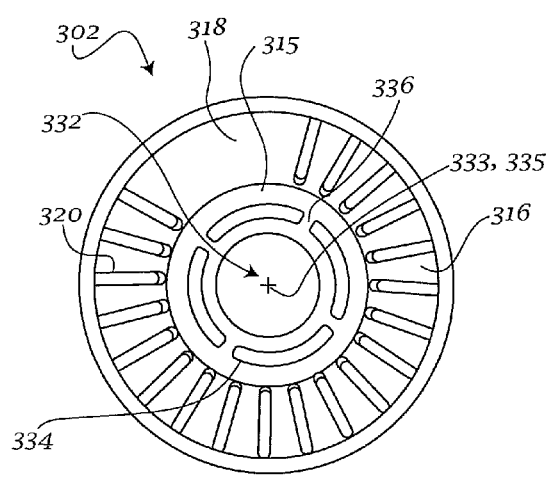

FIG. 4 is a perspective view of an alternative filtering assembly 300 that may be used with filtering system 100. FIG. 5a is a perspective view of an alternative strainer 302 that may be used with filtering assembly 300. FIG. 5b is a top view of strainer 302. Filtering assembly 300 may be coupled to a multi-port valve (not shown) that may be substantially similar to multi-port valve 202 shown in FIGS. 2a and 2b. In the exemplary embodiment, filtering assembly 300 includes strainer 302, a diffuser column 304, an equalizer column 306 and a diffuser head 308.

Figure 6:
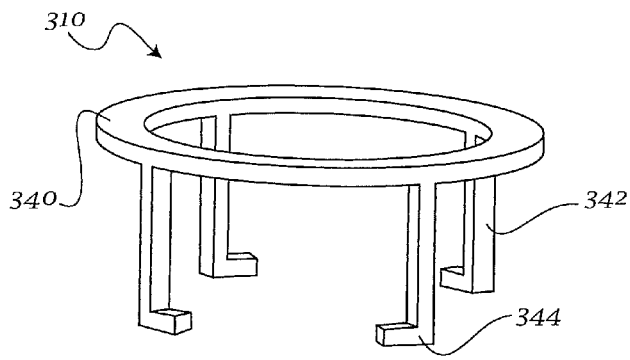
FIG. 6 is a perspective view of a circular disc check valve that may be used with the strainer shown in FIG. 4.

In the exemplary embodiment, the multi-port valve may be coupled to strainer 302, which may include a circular disc valve 310 slidably coupled to strainer 302. FIG. 6 is a perspective view of circular disc valve 310. In one embodiment, strainer 302 may include a substantially cylindrical portion 312 that may extend away from a substantially conical portion 314, wherein cylindrical portion 312 facilitates coupling strainer 302 to the multi-port valve. Moreover, strainer 302 may also include a bottom portion 315 coupled to conical portion 314, as shown in FIG. 5b. Conical portion 314 may include a slotted portion 316 and a non-slotted portion 318. Slotted portion 316 may include a plurality of evenly spaced strainer slots 320 defined therein, wherein strainer slots 320 are spaced circumferentially on conical portion 314 and may be oriented substantially radially thereon. Alternatively, strainer slots 320 may be oriented in any position and/or orientation known to a person having ordinary skill in the art that enables filtering assembly 300 to function as described herein. In one embodiment, strainer slots 320 may be sized to facilitate preventing filter media 116 from entering strainer 302 during the backwash mode, as described in more detail below.

Moreover, conical portion 314 may include an attachment portion 322 that extends away therefrom. In one embodiment, attachment portion 322 may include a radially inner annular wall 324 and a radially outer annular wall 326. Inner annular wall 324 may define a diffuser column channel 328 that may be coupled in flow communication to diffuser column 304, as described in more detail below. Outer annular wall 326 may be radially spaced a distance away from inner annular wall 324 such that an annular gap 330 is defined therebetween. In one embodiment, annular gap 330 may be coupled in flow communication to equalizer column 306, as described in more detail below. As shown in FIG. 5b, bottom portion 315 may include a center aperture 332 defined therein that may be positioned in flow communication with diffuser column channel 328. Moreover, center aperture 332 may be substantially coaxial with a central axis 333 of strainer 302. Bottom portion 315 may include a plurality of substantially arcuate slots 334 defined therein and spaced radially away from center aperture 332. Moreover, arcuate slots 334 may extend substantially circumferentially about center aperture 332 such that arcuate slots 334 have an arcuate slot axis 335 that is substantially coaxial with central axis 333 of strainer 302. Arcuate slots 334 may be positioned in flow communication with annular gap 330. A plurality of dividers 336 may extend between circumferentially adjacent arcuate slots 334.

Circular disc valve 310, as shown in FIG. 6, may include a ring stop portion 340, a plurality of legs 342 extending away from ring stop portion 340 and feet 344 that are coupled to an end of each leg 342 and extend away therefrom. In one embodiment, circular disc valve 310 may be slidably coupled to bottom portion 315 of strainer 302. More specifically, legs 342 may be positioned within arcuate slots 334 and positioned such that feet 344 may contact dividers 336. As a result, circular disc valve 310 may slide from a substantially close position to a substantially open position. In the substantially closed position, ring stop portion 340 may contact bottom portion 315 enabling arcuate slots 334 to be sealed, which facilitates preventing water from flowing from strainer 302 to equalizer column 306 via arcuate slots 334. In the substantially open position, circular disc valve 310 may slide away from bottom portion 315 until feet 344 contact dividers 336. In such a position, water may be channeled from equalizer column 306 to strainer 302 and the multi-port valve via arcuate slots 334, as described in more detail below.

In one embodiment, diffuser column 304 may be coupled to inner annular wall 324 such that water may be channeled between diffuser column 304 and the multi-port valve, as described in more detail below. Equalizer column 306 may be coupled to outer annular wall 326 such that water may be channeled between equalizer column 306 and strainer 302. In one embodiment, diffuser column 304 may have a diameter that is substantially smaller than a diameter of equalizer column 306. Moreover, diffuser column 304 may be positioned within equalizer column 306 such that an annular gap 345 may be defined between diffuser column 304 and equalizer column 306. Annular gap 345 may be coupled in flow communication with annular gap 330 of strainer 302. In one embodiment, equalizer column 306 may be made out of plastic. Alternatively, equalizer column 306 may be made out of any material known to a person having ordinary skill in the art that enables filtering assembly 300 to function as described herein.

In one embodiment, equalizer column 306 may have a diameter of about 3 inches and diffuser column 304 may have a diameter of about 2 inches. As a result, annular gap 345 may have a radial space that measures about 0.5 inches. Alternatively, equalizer column 306 and diffuser column 304 may have diameters of any size such that the diameter of equalizer column 306 is substantially larger than the diameter of diffuser column 304. In one embodiment, equalizer column 306 may include a plurality equalizer slots 346 defined therein and spaced evenly from a top end of equalizer column 306 to a bottom end of equalizer column 306. In one embodiment, equalizer slots 346 may have a total width that may be substantially equal to about half of a length of equalizer column 306. In one embodiment, each equalizer slot 346 may have a width that is approximately $\frac{1}{8}^{th}$ of an inch, and a length that extends approximately $\frac{1}{3}^{rd}$ of the outer circumference of equalizer column 306. Alternatively, equalizer slots 346 may have any width and/or any length known to a person having ordinary skill in the art that enables filtering assembly 300 to function as described herein. In one embodiment, equalizer column 306 may include at least two sets of equalizer slots 346 such that a first set may be positioned diametrically opposite to a second set on the outer circumference of equalizer column 306.

Figure 7:
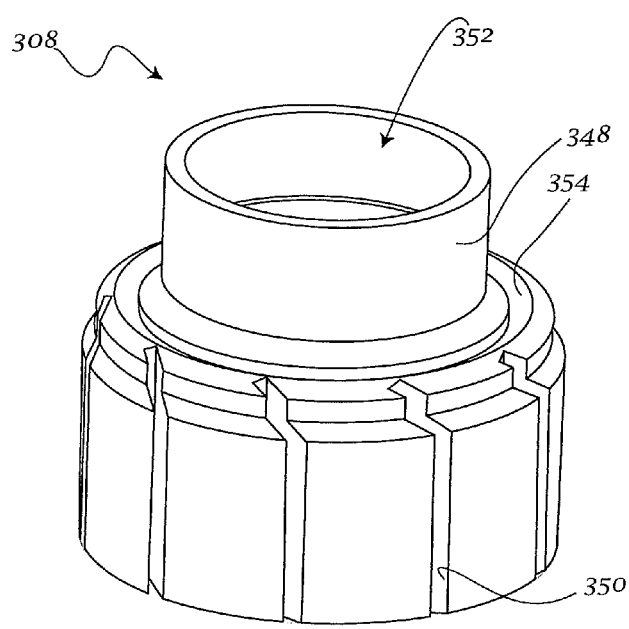
FIG. 7 is a perspective view of an alternative diffuser head that may be used with both the filtering assemblies shown in FIGS. 2a and 4.

FIG. 7 is a perspective view of diffuser head 308 that may be used with filtering assembly 300. Equalizer column 306 and diffuser column 304 may be coupled to diffuser head 308. As a result, a length of equalizer column 306 may be substantially equal to a length of diffuser column 304. In one embodiment, diffuser head 308 includes an attachment portion 348 that facilitates coupling to diffuser column 304. Moreover, diffuser head 308 may include a plurality of diffuser slots 350 that may be defined in a substantially cylindrical body of diffuser head 308. Diffuser slots 350 may be oriented at an angle with respect to a line (not shown) that is substantially tangent to an outer surface of the substantially cylindrical body. As a result, diffuser slots 350 may function substantially similar to diffuser slots 229 of filtering assembly 200. Attachment portion 348 may have a diameter that is sized to facilitate coupling attachment portion 348 to diffuser column 304. In one embodiment, attachment portion 348 may define a diffuser head channel 352 therein that may be coupled in flow communication with diffuser column 304. Diffuser head channel 352 may facilitate channeling water between tank 102 and diffuser column 304 via diffuser slots 350. In one embodiment, diffuser head 308 may include an annular groove 354 that is sized and oriented such that equalizer column 306 may be coupled thereto. In such an embodiment, equalizer column 306 may be coupled to diffuser head 308 such that annular gap 345 is substantially sealed by diffuser head 308 using annular groove 354.

During operation, system 100, and more specifically filtering assembly 200 may be used in, but not limited to, a filtering mode and a backwash mode. During the filtering mode, water, or fluid enters filtering assembly 300 through the multi-port valve, such as multi-port valve 202 in FIGS. 2a and 3b. The water is then channeled through the multi-port valve into strainer 302. The water entering strainer 302 contacts non-slotted portion 318 of strainer 302 and facilitates applying positive pressure to circular disc valve 310 such that circular disc valve 310 slides toward bottom portion 315 and substantially seals arcuate slots 334. As such, circular disc valve 310 facilitates preventing water from flowing into annular gaps 330 and 345. Therefore the water flowing into strainer 302 from the multi-port valve exits strainer 302 through strainer slots 320. The water then enters cavity 104 of tank 102 and contacts filter media 116 substantially near the top of tank 102. The dirty water may contain particulate matter (not shown) from that requires filtering. Larger particulate matter (not shown) may be filtered out of the water near the top of the bed of filter media 116. Finer particulate matter (not shown) may flow through filter media 116 and may be trapped therein, which facilitates substantially filtering the water. The substantially filtered water may then be channeled from tank 102 into diffuser head 308 via diffuser slots 350, wherein the filtered water may be channeled up diffuser column 304 towards the multi-port valve. The filtered water may be channeled out of the multi-port valve, which may be connected to a hose line (not shown) that channels the filtered water back to a source of the water. Alternatively, the filtered water may be channeled to an area independent from the source of the dirty water.

In one embodiment, the backwash mode may be used to flush out the filtered particulate matter that has collected in tank 102 and more specifically filter media 116. During backwash mode, a user may manipulate the multi-port valve such that the flow of water is reversed, with respect to the filtering mode. In one embodiment, water entering filtering assembly 300 may be channeled from the multi-port valve through diffuser column 304 and may exit filtering assembly 300 through diffuser slots 350. In one embodiment, diffuser slots 350 may facilitate stirring and agitating the bed of filter media 116 such that a substantially swirling effect, or cyclonic action, occurs, as described in filtering system 200 above. In one embodiment, the cyclonic action unpacks the bed of filter media 116 into the swirling water, which enables the dirt, debris and other particulate matter trapped on and/or within filter media 116 to be released into the water to facilitate creating a dirty water mixture.

The dirty water mixture may be channeled out of tank 102 through strainer 302 using strainer slots 320 and then channeled out of filtering assembly 300 using the waste aperture (not shown) of the multi-port valve. In the event water was only channeled out of tank 102 using strainer slots 320, due to the neutral buoyancy of filter media 116, filter media 116 may pack around strainer slots 320, which may facilitate increasing the pressure substantially near a top portion of strainer 302 and of tank 102, which may facilitate increasing an amount of water necessary to clean system 100. In the exemplary embodiment, equalizer column 306 facilitates providing a second exit for the dirty water. During backwash mode, incoming water is no longer entering tank 102 via strainer 302. As a result, there is no positive pressure closing circular disc valve 310. Accordingly, circular disc valve 310 may open to facilitate channeling dirty water from tank 102 to strainer 302 and the multi-port valve via equalizer slots 346 and annular gap 345. Therefore, equalizer column 306 facilitates relieving the pressure build-up at the top of filter tank 102 by channeling water through a second exit using equalizer slots 346 of equalizer column 306, which facilitates preventing filter media 116 from packing and building up around strainer 302. As a result, equalizer column 306 enables filter media 116 to remain suspended in the water, due to the neutral buoyancy of filter media 116, as filtering assembly 300 agitates filter media 116 in a cyclonic manner for rapid removal of dirt, debris and other particulate matter trapped inside filter media 116.

In the exemplary embodiment, filtering assembly 300, and more specifically equalizer column 306, facilitates reducing an amount of time, water and energy requires to clean system 100. Moreover, equalizer column 306 facilitates preventing filter media 116 from gathering or packing near strainer 302. Specifically, filter media 116 flows over and around equalizer column 306 without any obstructions. As a result, filtering system 300 facilitates providing better circulation and agitation of the biological media bed during backwash mode than a filtering system that includes a separate equalizer column that is not co-axial with the diffuser column. As such, the amount of time, water and energy required to remove the dirty water from filtering system 100 is significantly reduced. Moreover, the time and cost of manufacturing and maintaining filtering assembly 300 is reduced compared to systems where the drain assembly is coupled to the wall of filter tank 102.

Figure 8:
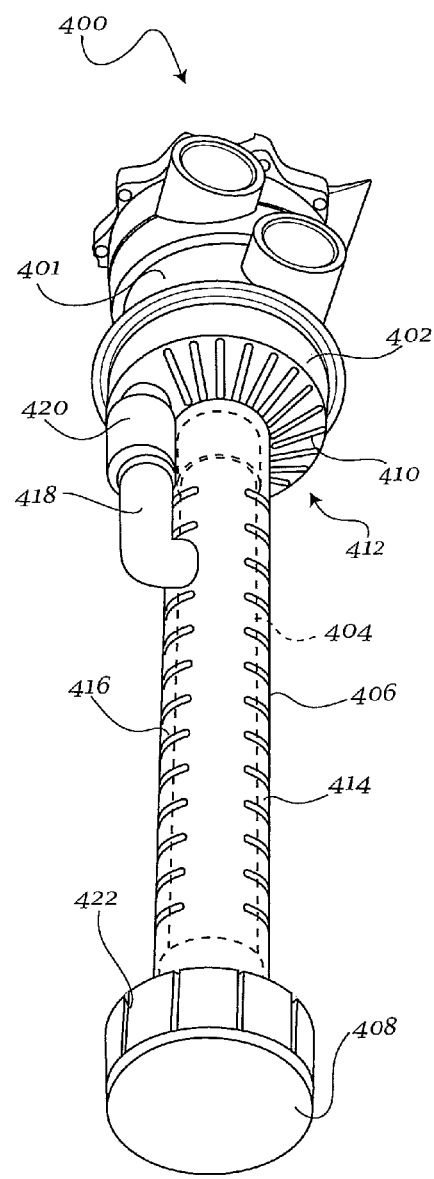
FIG. 8 is a side view of another alternative filtering assembly that may be used with the filtering system shown in FIG. 1.

FIG. 8 is a side view of an alternative filtering assembly 400 that may be used with filtering system 100. Filtering assembly 400 is substantially similar to filtering assembly 300. Filtering assembly 400 may include a multi-port valve 401 that may be substantially similar to multi-port valve 202 shown in FIGS. 2a and 2b. Moreover, filtering assembly 400 may include a strainer 402 that is substantially similar to strainer 204. Filtering assembly 400 may also include diffuser column 404, an equalizer column 406 and diffuser head 408.

In the exemplary embodiment, multi-port valve 401 may be coupled to strainer 402, wherein strainer 402 may include a plurality of evenly spaced strainer slots 410 defined on a conical portion 412. Strainer slots 410 may be spaced circumferentially on conical portion 412, similar to strainer slots 320 as described in filtering assembly 300 above. Diffuser column 404 may be coupled to strainer 402 and coupled in flow communication to multi-port valve 401. As a result, fluid may be channeled from multi-port valve 401 to diffuser column 404. Moreover, diffuser column 404 may have a diameter that is substantially smaller than a diameter of equalizer column 406. In one embodiment, diffuser column 404 may be positioned within equalizer column 406 such that an annular gap 414 may be defined between diffuser column 404 and equalizer column 406.

Equalizer column 406 may include a plurality of equalizer slots 416 that may be similar to equalizer slots 346 of filtering assembly 300, described above. Moreover, equalizer column 406 may be coupled to strainer 402. However, equalizer column 406 is not coupled in flow communication with strainer 402. Rather, strainer 402 facilitates sealing a top end of equalizer column 406. Moreover, diffuser head 408 is coupled to a bottom end of equalizer column 406 and facilitates sealing a bottom end of equalizer column 406. A pipe 418 may be coupled in flow communication to strainer 402 and equalizer column 406 such that pipe 418 facilitates channeling fluid from annular gap 414 to strainer 402. Moreover, pipe 418 may also include a check valve 420 coupled thereto, wherein check valve 420 is substantially similar to and performs a substantially similar function as check valve 234 as described in filtering assembly 200 above.

During operation, system 100, and more specifically filtering assembly 400 may be used in, but not limited to, a filtering mode and a backwash mode. During the filtering mode, water, or fluid enters filtering assembly 400 through multi-port valve 401. The water is then channeled through multi-port valve 401 into strainer 402. The water entering strainer 302 contacts non-slotted portion 318 of strainer 302, and more specifically, a valve mechanism (not shown) of check valve 420. As a result, the entering water facilitates exerting a positive pressure on check valve 420, which facilitates closing check valve 420. As such, check valve 420 facilitates preventing water from flowing into pipe 418 and annular gap 414. Therefore the water flowing into strainer 402 from multi-port valve 401 exits strainer 402 through strainer slots 410. The water then enters cavity 104 of tank 102 and contacts filter media 116 substantially near the top of tank 102. The dirty water may contain particulate matter (not shown) from that requires filtering. Larger particulate matter (not shown) may be filtered out of the water near the top of the bed of filter media 116. Finer particulate matter (not shown) may flow through filter media 116 and may be trapped therein, which facilitates substantially filtering the water. The substantially filtered water may then be channeled from tank 102 into diffuser head 408 via a plurality of diffuser slots 422, wherein the filtered water may be channeled up diffuser column 404 towards multi-port valve 401. The filtered water may be channeled out of multi-port valve 401, which may be connected to a hose line (not shown) that channels the filtered water back to a source of the water. Alternatively, the filtered water may be channeled to an area independent from the source of the dirty water.

In one embodiment, the backwash mode may be used to flush out the filtered particulate matter that has collected in tank 102 and more specifically filter media 116. During backwash mode, a user may manipulate the multi-port valve such that the flow of water is reversed, with respect to the filtering mode. In one embodiment, water entering filtering assembly 400 may be channeled from multi-port valve 401 through diffuser column 404 and may exit filtering assembly 400 through diffuser slots 422. In one embodiment, diffuser slots 422 may facilitate stirring and agitating the bed of filter media 116 such that a substantially swirling effect, or cyclonic action, occurs, as described in filtering system 300 above. In one embodiment, the cyclonic action unpacks the bed of filter media 116 into the swirling water, which enables the dirt, debris and other particulate matter trapped on and/or within filter media 116 to be released into the water to facilitate creating a dirty water mixture.

The dirty water mixture may be channeled out of tank 102 through strainer 402 using strainer slots 410 and then channeled out of filtering assembly 400 using the waste aperture (not shown) of multi-port valve 401. In the event water was only channeled out of tank 102 using strainer slots 410, due to the neutral buoyancy of filter media 116, filter media 116 may pack around strainer slots 410, which may facilitate increasing the pressure substantially near a top portion of strainer 402 and of tank 102, which may facilitate increasing an amount of water necessary to clean system 100. In the exemplary embodiment, equalizer column 406 facilitates providing a second exit for the dirty water. During backwash mode, incoming water is no longer entering tank 102 via strainer 302. As a result, there is no positive pressure closing check valve 420. Accordingly, check valve 420 may open to facilitate channeling dirty water from annular gap 414 of equalizer column 406 to strainer 402 and multi-port valve 401 via pipe 418 and equalizer slots 416. Therefore, equalizer column 406 facilitates relieving the pressure build-up at the top of filter tank 102 by channeling water through a second exit using equalizer slots 416 of equalizer column 406, which facilitates preventing filter media 116 from packing and building up around strainer 402. As a result, equalizer column 406 enables filter media 116 to remain suspended in the water, due to the neutral buoyancy of filter media 116, as filtering assembly 400 agitates filter media 116 in a cyclonic manner for rapid removal of dirt, debris and other particulate matter trapped inside filter media 116.

As a result, filter media 116 flows over and around equalizer column 406 without any obstructions. As a result, filtering system 400 facilitates providing better circulation and agitation of the biological media bed during backwash mode than a filtering system that includes a separate equalizer column that is not co-axial with the diffuser column.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A filter apparatus comprising:
    a multi-port valve;
    a strainer coupled in flow communication to said multi-port valve, said strainer comprising a slotted portion and a non-slotted portion;
    an equalizer column coupled in flow communication to said strainer and having a first diameter;
    a diffusing column coupled to said strainer and coupled in flow communication to said multi-port valve, said diffuser column having a second diameter that is substantially smaller than said first diameter, wherein said diffuser column is positioned within said equalizer column such that a substantially annular gap is defined between said diffuser column and said equalizer column.

2. The filter apparatus according to claim 1, further comprising a diffuser head coupled to said diffuser column and to said equalizer column.

3. The filter apparatus according to claim 1, wherein said strainer comprises:
    a conical portion that comprises a slotted portion and a non-slotted portion; and
    a bottom portion coupled to said conical portion, said bottom portion includes a central aperture defined therein and a plurality of arcuate slots defined in said bottom portion and positioned circumferentially about said central aperture and spaced a distance substantially radially from said central aperture.

4. The filter apparatus according to claim 3, further comprising:
    a circular check valve slidably coupled to said strainer, said circular check valve comprising:
        an annular ring stop portion;
        a plurality of legs extending away from said annular ring stop portion; and
        a plurality of feet coupled to said plurality of legs.

5. The filter apparatus according to claim 1, wherein said equalizer column includes a plurality of equalizer slots defined therein.

6. The filter apparatus according to claim 1, further comprising a pipe coupled in flow communication to said strainer and said equalizer column.

7. The filter apparatus according to claim 6, further comprising a check valve coupled to said pipe.

* * * * *